United States Patent
Bartolome (10) Patent No.: US 10,391,734 B2
(45) Date of Patent: *Aug. 27, 2019

(54) COMPOSITE SANDWICH PANEL WITH DIFFERENTIAL RESIN LAYERS

(71) Applicant: B/E AEROSPACE INC., Wellington, FL (US)

(72) Inventor: Alvin S. Bartolome, Eastvale, CA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 225 days.

This patent is subject to a terminal disclaimer.

(21) Appl. No.: 15/249,375

(22) Filed: Aug. 27, 2016

(65) Prior Publication Data

US 2016/0361889 A1    Dec. 15, 2016

Related U.S. Application Data

(63) Continuation-in-part of application No. 14/631,770, filed on Feb. 25, 2015, now Pat. No. 9,573,338.

(Continued)

(51) Int. Cl.
*B32B 3/12* (2006.01)
*B29C 65/02* (2006.01)
(Continued)

(52) U.S. Cl.
CPC ............... *B32B 3/12* (2013.01); *B29C 65/02* (2013.01); *B29C 66/721* (2013.01);
(Continued)

(58) Field of Classification Search
None
See application file for complete search history.

(56) References Cited

U.S. PATENT DOCUMENTS

| 4,029,845 A | 6/1977 | Nomura |
| 4,925,728 A | 5/1990 | Crass |

(Continued)

FOREIGN PATENT DOCUMENTS

| CN | 102476475 A | 5/2012 |
| CN | 102756531 A | 10/2012 |

(Continued)

OTHER PUBLICATIONS

First Office Action on Chinese Application No. 201580020658.1 dated Nov. 1, 2017. 11 pages.

(Continued)

*Primary Examiner* — Kevin M Bernatz
(74) *Attorney, Agent, or Firm* — Donna P. Suchy (57) ABSTRACT

A composite panel is constructed by preparing a panel assembly layup including a first prepreg layer having reinforcement material, a first layer of a resin formulation upon a first outer surface, and a second layer of the resin formulation upon an opposing outer surface, where the first layer is thinner than the second layer, and the first layer is presented toward a mold. The layup includes a core layer directly abutting the second layer. They layup includes a second prepreg layer having a first layer of the resin formulation upon a first outer surface, and a second layer of the resin formulation upon an opposing outer surface, where the first layer is thinner than the second layer, and the second layer directly abuts the core layer. The panel assembly is cured in the mold.

14 Claims, 7 Drawing Sheets

Related U.S. Application Data (60) Provisional application No. 61/945,344, filed on Feb. 27, 2014.

(51) Int. Cl.

| | | |
|---|---|---|
| *B29C 65/00* | (2006.01) | |
| *B32B 37/14* | (2006.01) | |
| *B32B 15/20* | (2006.01) | |
| *B32B 27/06* | (2006.01) | |
| *B32B 5/02* | (2006.01) | |
| *B32B 5/12* | (2006.01) | |
| *B32B 5/14* | (2006.01) | |
| *B32B 5/28* | (2006.01) | |
| *B32B 7/04* | (2019.01) | |
| *B32B 27/04* | (2006.01) | |
| *B32B 27/42* | (2006.01) | |
| *B29C 70/08* | (2006.01) | |
| *B32B 7/05* | (2019.01) | |
| *B32B 37/18* | (2006.01) | |
| *B29K 101/10* | (2006.01) | |
| *B29K 101/12* | (2006.01) | |
| *B29K 105/12* | (2006.01) | |
| *B29K 105/00* | (2006.01) | |
| *B29L 9/00* | (2006.01) | |
| *B32B 37/00* | (2006.01) | |
| *B29L 31/60* | (2006.01) | |

(52) U.S. Cl.
CPC ........ *B29C 66/7254* (2013.01); *B29C 66/735* (2013.01); *B29C 66/7392* (2013.01); *B29C 66/7394* (2013.01); *B29C 66/73752* (2013.01); *B29C 66/7422* (2013.01); *B29C 70/08* (2013.01); *B32B 5/02* (2013.01); *B32B 5/12* (2013.01); *B32B 5/145* (2013.01); *B32B 5/28* (2013.01); *B32B 7/04* (2013.01); *B32B 7/05* (2019.01); *B32B 15/20* (2013.01); *B32B 27/04* (2013.01); *B32B 27/06* (2013.01); *B32B 27/42* (2013.01); *B32B 37/146* (2013.01); *B29K 2101/10* (2013.01); *B29K 2101/12* (2013.01); *B29K 2105/12* (2013.01); *B29K 2105/253* (2013.01); *B29L 2009/003* (2013.01); *B29L 2031/608* (2013.01); *B32B 37/182* (2013.01); *B32B 2037/0092* (2013.01); *B32B 2250/03* (2013.01); *B32B 2250/40* (2013.01); *B32B 2255/02* (2013.01); *B32B 2260/021* (2013.01); *B32B 2260/046* (2013.01); *B32B 2262/101* (2013.01); *B32B 2262/106* (2013.01); *B32B 2305/076* (2013.01); *B32B 2305/08* (2013.01); *B32B 2305/22* (2013.01); *B32B 2305/72* (2013.01); *B32B 2307/718* (2013.01); *B32B 2307/738* (2013.01); *B32B 2311/24* (2013.01); *B32B 2398/10* (2013.01); *B32B 2398/20* (2013.01); *B32B 2605/18* (2013.01); *B32B 2607/00* (2013.01); *Y10T 428/2495* (2015.01); *Y10T 428/24165* (2015.01)

(56) References Cited

U.S. PATENT DOCUMENTS

| | | | |
|---|---|---|---|
| 5,034,256 A | | 7/1991 | Santiso et al. |
| 5,167,870 A | * | 12/1992 | Boyd ................ H01Q 1/42 523/137 |
| 5,492,722 A | | 2/1996 | Tait |
| 5,667,866 A | * | 9/1997 | Reese, Jr. ................ B32B 3/12 428/116 |
| 6,429,157 B1 | | 8/2002 | Kishi |
| 6,440,257 B1 | | 8/2002 | Zhou et al. |
| 6,537,413 B1 | * | 3/2003 | Hochet ................ B29C 70/088 156/297 |
| 7,186,310 B2 | | 3/2007 | Yamaguchi et al. |
| 9,573,338 B2 | * | 2/2017 | Bartolome ............... B32B 3/12 |
| 2002/0146954 A1 | | 10/2002 | Drees |
| 2003/0098520 A1 | * | 5/2003 | Cournoyer ............ B29C 70/086 264/156 |
| 2005/0161154 A1 | * | 7/2005 | Anderson ............... B29C 70/34 156/278 |
| 2005/0249937 A1 | * | 11/2005 | Yamada ................ B29C 70/443 428/317.1 |
| 2006/0004714 A1 | | 1/2006 | Popescu |
| 2006/0204714 A1 | | 9/2006 | Wang |
| 2007/0268173 A1 | * | 11/2007 | Randy ...................... F41H 3/00 342/2 |
| 2011/0014356 A1 | * | 1/2011 | Fornes .................... C09D 7/62 427/58 |
| 2011/0052881 A1 | * | 3/2011 | Netravali .................. B32B 9/02 428/178 |
| 2011/0303355 A1 | * | 12/2011 | Sumi .................. B29C 47/0019 156/245 |
| 2015/0030806 A1 | * | 1/2015 | Fink .......................... B32B 3/12 428/116 |
| 2015/0132532 A1 | * | 5/2015 | Preisler ................ B32B 27/065 428/85 |
| 2016/0361910 A1 | * | 12/2016 | Franck, III ............ B32B 37/182 |
| 2017/0015081 A1 | * | 1/2017 | Massarelli ............. B32B 37/08 |
| 2017/0348951 A1 | * | 12/2017 | Curfman .................. B32B 27/10 |

FOREIGN PATENT DOCUMENTS

| | | |
|---|---|---|
| EP | 1 055 513 A1 | 11/2000 |
| JP | 55-67413 A | 5/1980 |
| JP | 58-11142 A | 1/1983 |
| WO | WO 00/73055 A1 | 12/2000 |

OTHER PUBLICATIONS

International Search Report dated Jul. 3, 2015 in PCT/US2015/017847, published as WO 2015/130985 dated Sep. 3, 2015, 3 pages.
B/E-TEKLAM High Performance Composite Panels, B/E Aerospace brochure, 21 pages.

* cited by examiner

COMPOSITE SANDWICH PANEL WITH DIFFERENTIAL RESIN LAYERS

CROSS REFERENCES TO RELATED APPLICATIONS

This application is a continuation-in-part of U.S. application Ser. No. 14/631,770 filed Feb. 25, 2015, now U.S. Pat. No. 9,573,338, which claims priority from U.S. Provisional Application No. 61/945,344, filed Feb. 27, 2014, the contents of both of which are incorporated herein by reference in their entirety.

BACKGROUND

Composite panels are used in a wide variety of applications where high strength and light weight are required such as in the aircraft industry. A composite panel can be made of a structural core sandwiched by a pair of skins or prepregs. A prepreg is a fabric reinforcement that has been pre-impregnated with a resin system, such as a phenolic resin. The resin system is typically an epoxy that includes a respective curing agent. After the prepreg is cured and bonded to the core, the prepreg is considered a skin or a face sheet. A staging classification describes partial curing of the prepreg thermosetting resin system. An A-stage is commonly referred to as a monomer stage, a B-state intermediate typical of prepregs, and a C-stage fully cured material.

One such composite panel is the A502 panel intended for use in primary and secondary aerospace applications, offered by Teklam Corp. of Corona, Calif. The Teklam A502 panel includes a 2024T3 clad aluminum facings of a thickness of 0.02" and a one quarter inch 5052-0015-3.4 aluminum honeycomb core. See http://www.teklam.com/teklam_A502_panel.html for data sheet and further information. The A502 panel has an evenly distributed low resin content with an auxiliary film adhesive for bonding the honeycomb core and the aluminum facings.

The A502 panel includes a film and an adhesive that can be represented as follows: a prepreg with 0.02 lbs/sqft (pounds per square foot) of an adhesive resin evenly distributed throughout, a film adhesive weighing 0.03 lbs/sqft, and a honeycomb core.

In a traditional prepreg, the resin content is distributed evenly throughout the prepreg so that an amount of resin on one surface is equal to the amount of resin on the other surface. The overall weight of the fabric reinforcement and the resin in the foregoing example is 0.05 lbs/sqft (0.02 lbs/sqft prepreg and 0.03 lbs/sqft adhesive).

The manufacture of this panel requires cutting and laying up of the two materials onto the core, which adds to its manufacturing cost. The inventor realized that a resin layer is applied across the core in an even distribution despite the fact that it is not necessary to do so.

Typically, an adhesive is used to bond the face sheets to the honeycomb core. The adhesive must rigidly attach the face sheets to the honeycomb core in order for loads to be transmitted from one face sheet to the other. If the adhesive fails, the strength of the panel is severely compromised. The adhesive is especially critical in composite panels that use a honeycomb design for the core because of the relatively small surface area over which edges of the honeycomb core contact the face sheets.

One procedure for applying the face sheets to the honeycomb core involves using a prepreg sheet that includes at least one fibrous reinforcement layer and an uncured resin matrix. As a result, the prepreg can be laid into a mold without addition of additional resin and without additional steps required of a typical hand lay-up.

A film adhesive is typically added to the core and it is then bonded to the honeycomb by curing of both the prepreg resin and adhesive resin at an elevated temperature. The film adhesive can be applied as a separate ply layer or as an integral part of the prepreg sheet. Inclusion of the film adhesive is necessary in the prior art construction and adds additional weight to the panel.

An alternative method of bonding the face sheets to the core involves applying an adhesive to edges of the core. The adhesive is typically applied by dipping the edges of the core in the adhesive. Adhesives used in this type bonding are typically referred to as dip resins or dip adhesives. The advantage of this method is that the adhesive is located only where the edges of the core contact the face sheet, rather than being distributed over the entire face sheet. This method is generally used to bond non-adhesive face sheets, such as aluminum and other metallic face sheets, to the core.

There is a need in the aerospace and transportation industry for an improved panel having reduced weight.

SUMMARY OF ILLUSTRATIVE EMBODIMENTS

The inventor realized, among other things, that a lighter weight panel could be constructed by asymmetrically applying resin to the skins or films applied to either side of the honeycomb layer. In some embodiments the resin layers on the inward-facing side of the prepreg layers have a comparatively thick layer of adhesive so as to promote adhesions of the prepreg to the edges of the honeycomb core within the need for the labor-intensive honeycomb dipping step described above. In one embodiment, a composite panel includes a core having a lattice based on a repeating geometric shape (such as a honeycomb core), a first skin a having a reinforcement layer with a first inner surface attached directly to a first side of the core using an inner resin layer and an outer surface having a first outer resin layer, and a second skin having a reinforcement layer with an inner surface attached directly to a second side of the core using an second inner resin layer and an outer surface having a second outer resin layer, where a thickness of the inner resin layer is greater than a thickness of the outer resin layer. Such an embodiment reduces the weight of the panels by 5% to 15%, and in certain applications about 10%. That, in turn, substantially lightens the aircraft and thereby enhances safety and/or fuel economy and, in some applications, allows more passengers or cargo to be transported on the aircraft.

Significantly, those in the film and composite panel industry expressed substantial skepticism that the aforementioned embodiment was practical. Among the concerns expressed was the likelihood that any asymmetrially applied resin would migrate through the prepreg during a subsequent pressing operation, as is typically done during assembly or manufacturing of a honeycomb panel. The belief was that the resin thickness differential would be thereby lost during pressing. However, the inventor realized among other things that this would not occur and testing verified the same.

In certain preferred embodiments, each prepreg layer consists of two of two or more sub-layers of fabric each having unidirectional fiber reinforcement. Those layers can be oriented at 90 degrees relative to one another. Resin migration during pressing is inhibited particularly well in such embodiments as compared to fabric weave embodiments. Such embodiments are also comparatively inexpensive as compared to a weave prepreg panels. More granular control is also provided over the strength of the panel, as single unidirectional layers can be added (also in perpendicular orientations or other nonparallel orientations such as 30, 45 or 60 degrees) as desired to strengthen the panel to a degree sufficient for a given application while keeping the weight as low as possible.

BRIEF DESCRIPTION OF THE DRAWINGS

A more complete appreciation of the innovations and many of the attendant advantages thereof will be readily obtained as the same becomes better understood by reference to the following detailed description when considered in connection with the accompanying drawings, where.

DETAILED DESCRIPTION OF ILLUSTRATIVE EMBODIMENTS

Referring now to the drawings, like reference numerals designate identical or corresponding parts throughout the several views.

Figure 1:
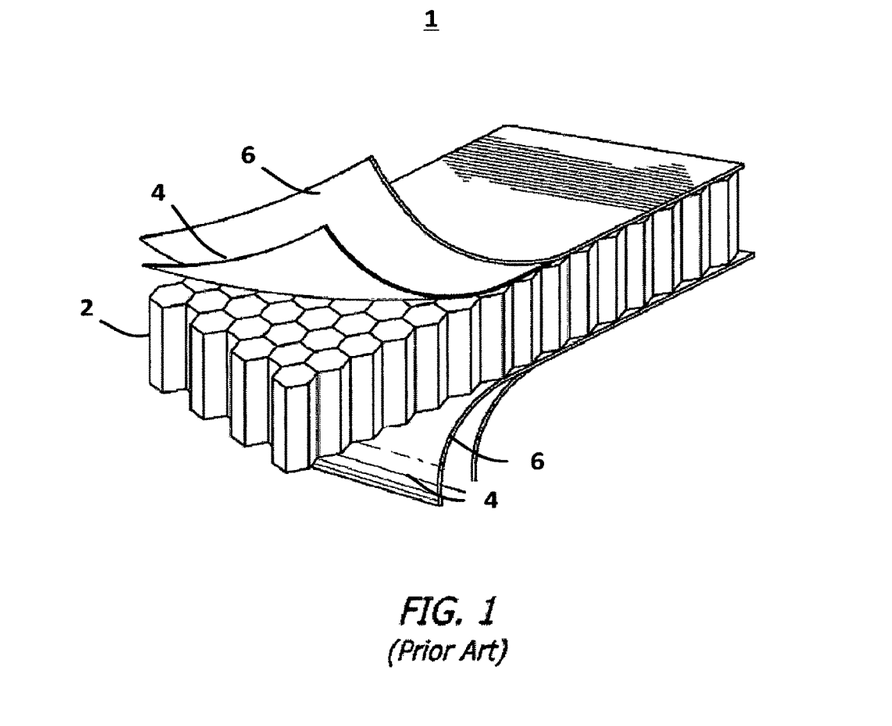
FIG. 1 is an elevated, perspective view of a prior art honeycomb core composite panel according to an example of the prior art.

FIG. 1 illustrates a prior art composite panel 1 having a honeycomb core 2, sandwiched by two adhesive films 4 that bond a pair of outer skins 6 to the composite panel 1. In this configuration, both the outer skins 6 and the adhesive films 4 must be cut and matched up precisely before a curing step to bond them together. Details of the cutting and curing process are described generally in U.S. Pat. No. 7,186,310 entitled "Method for Forming a Honeycomb Composite Sandwich Panel", the contents of which are fully incorporated herein by reference.

Figure 2:
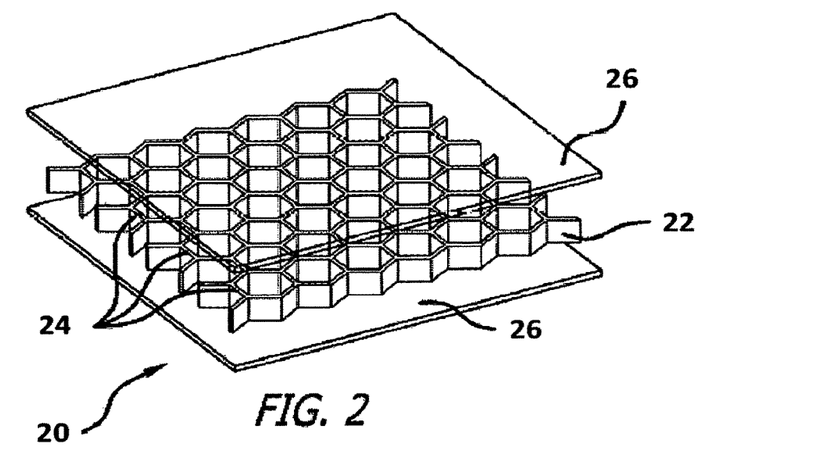
FIG. 2 is an elevated perspective view of a honeycomb core for a panel according to an example.

FIG. 2 illustrates an improved composite panel 20 having a reduced weight by optimization of a resin amount and asymmetrical or differential distribution. By supplying a differential resin thickness, each panel can be cured without a separate adhesive sheet and the weight of the adhesive film 4 used in the prior art panel has thereby been eliminated.

The overall weight of the panel, for example, may be reduced by at least about 10% as compared to a similar panel constructed using an adhesion layer. For example, the overall weight of the adhesive used in the A502 panel is 0.05 lbs/sqft (0.02 lbs/sqft prepreg and 0.03 lbs/sqft adhesive layer) has been reduced by an average of twenty percent as compared to a unidirectional fiberglass prepreg having a differential resin thickness including a first resin layer 0.008-0.010 lbs/sqft and a second resin layer 0.034-0.037 lbs/sqft, and a unidirectional carbon fiber prepreg having a differential resin thickness including a first resin layer 0.006-0.008 lbs/sqft and a second resin layer 0.033-0.036 lbs/sqft. In other embodiments in which the prepreg is more heavily laden with resin, the overall weight savings of the panel can be as much as 15 or 20%.

The panel 20 includes a geometric lattice (e.g., honeycomb) core 22 and a pair of prepreg resin fabric sheets ("prepregs") 26. After undergoing a curing process, each prepreg 26 layer is considered a skin. The honeycomb core gives the composite panel greater strength because of its high strength-to-weight ratio and resistance to fatigue failures. An aramid honeycomb core, in one example, can have a density of about 1.8 to 4 pounds per square foot with a compressive strength ranging, in some embodiments, from 86-1700 psi, a length-wise shear strength ranging, in some embodiments, from 55 to 440 psi, and a width-wise shear strength ranging, in some embodiments, from 45 to 315 psi. Aramid honeycomb cores are frequently used in external vehicular panels (e.g., boat hulls, train cars, auto racing bodies) as well as interior panels. A Kevlar® aramid honeycomb core, developed to aerospace standards, can have a density of about 2 to 6 pounds per square foot with a compressive strength ranging, in some embodiments, from 150-1000 psi, a length-wise shear strength ranging, in some embodiments, from 190 to 560 psi, and a width-wise shear strength ranging, in some embodiments, from 90 to 290 psi.

Aluminum honeycomb cores have good moisture, corrosion, and fungi resistance as well as flame resistance. They are often used for floor panels and countertops. An aluminum honeycomb core, in one example, can have a density of about 1.4 to 5.2 pounds per square foot with a compressive strength ranging, in some embodiments, from 75-620 psi, a length-wise shear strength ranging, in some embodiments, from 95 to 345 psi, and a width-wise shear strength ranging, in some embodiments, from 40 to 215 psi. Aerospace grade aluminum honeycomb core, used in bulkhead joiner panels, aircraft floors, and aircraft leading and trailing edges, can have a density of about 1 to 8.1 pounds per square foot with a compressive strength ranging, in some embodiments, from 30-1400 psi, a length-wise shear strength ranging, in some embodiments, from 45 to 725 psi, and a width-wise shear strength ranging, in some embodiments, from 50 to 455 psi.

A composite panel can be made of different combinations of the core 22 and a set of prepregs. Different examples of prepregs are shown in FIGS. 3A-3D. Different examples of composite panels having different sets of prepregs are shown in FIGS. 4A-4D. Examples of manufactured composite panels with skins made from phenolic fiberglass, epoxy fiberglass, and aluminum are shown in FIGS. 5A-5C respectively.

Figure 3A:
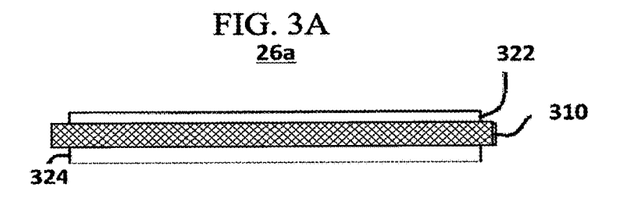
FIG. 3A illustrates a cross-sectional view of a prepreg including an inner resin layer, a reinforcement layer, and an outer resin layer according to an example.

In an example, a prepreg can have a set of differential resin layers. FIG. 3A illustrates a cross-sectional view of a prepreg 26a including an inner resin layer 324, a reinforcement layer 310, and an outer resin layer 322 according to an example.

Figure 3B:
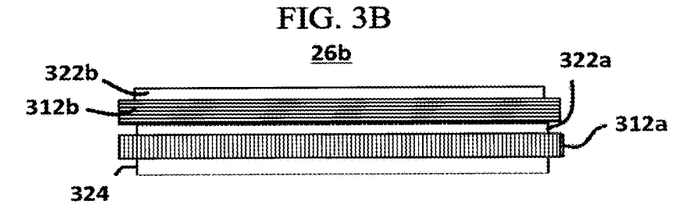
FIG. 3B illustrates a cross-sectional view of a prepreg including a first unidirectional reinforcement layer having fibers aligned in a first direction and a second unidirectional reinforcement having fibers aligned perpendicular to the first direction according to an example.

In an example, a prepreg can have different types of reinforcement layers. FIG. 3B illustrates a cross-sectional view of a prepreg 26b including a first unidirectional reinforcement layer having fibers aligned in a first direction and a second unidirectional reinforcement having fibers aligned perpendicular to the first direction according to an example.

Core

Figure 4A:
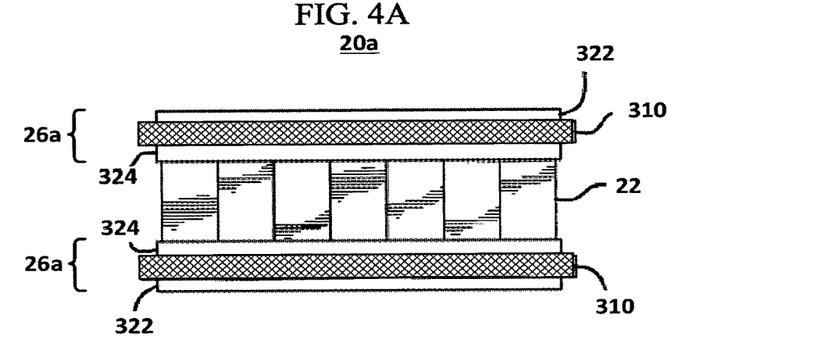
FIG. 4A illustrates a cross-sectional view of a composite panel including the core that is sandwiched between a pair of prepregs, where both prepregs are the prepreg shown in FIG. 3A according to an example.
Figure 5A:
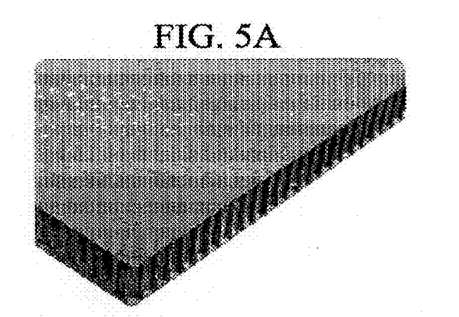
FIG. 5A is an elevated perspective view of a corner of a composite panel with a honeycomb core and an phenolic fiberglass skin according to an example.
Figure 5B:
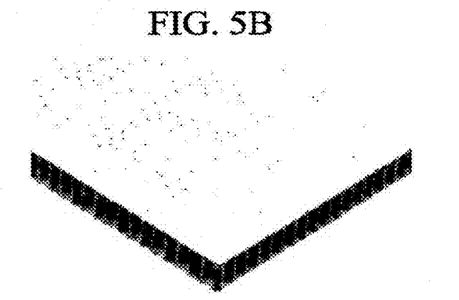
FIG. 5B is an elevated perspective view of a corner of a composite panel with a honeycomb core and an epoxy fiberglass skin according to an example.
Figure 5C:
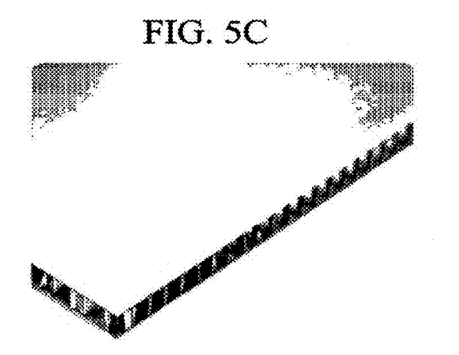
FIG. 5C is an elevated perspective view of a corner of a composite panel with a honeycomb core and an aluminum skin according to an example.

FIG. 4A illustrates a composite panel 20a made from a core 22 that is sandwiched between a pair of prepregs 26a according to an example. The core 22 includes a thin walled lattice edge 24 having repeating geometric shapes, e.g. hexagonals. The core 22 is configured to be an extremely lightweight, high-strength structure that can be manufactured with a wide variety of materials, including aramid fiber paper, aluminum, Kevlar®, Nomex®, steel, polystyrene, and polypropylene. In an example, the core 22 can be made from aramid fiber paper impregnated with a heat resistant resin. The core 22 provides the necessary rigidity and strength-to-weight ratio that are needed for aerospace applications, as well as other applications for sandwiched and composite panels.

Resin

The resin used in manufacture of the prepreg can be tailored to meet a material specification requirement of the application and intended use of the composite panel. Resins can be both thermoplastic and thermosetting. Types of resins include polymers, phenolic, bismaleimide, cyanate ester, polyester, and vinyl ester. In commercial airplane interior panel design, the resin used is typically an epoxy resin with a built-in curing agent. Epoxy resin, a type of polymer resin, provides the necessary adhesion properties as well as the viscosity to avoid much resin seepage into the honeycomb cells. It provides superior strength and dimensional stability to many other resins. Vinyl ester resin, a hybrid product, has excellent corrosion resistance and temperature resistance. However, it is not as strong as epoxy resin. Polyester resin is relatively inexpensive, easy to use and widely applicable. However, it lacks the strength of the epoxy resin and vinyl ester resin options. Phenolic resin provides heat resistance properties beneficial to flame retardance. Bismaleimide resin can be configured to cure during a two-phase temperature set without creating condensation by-products and can be used for co-curing over a honeycomb core. Cyanate ester resin has good moisture resistance, making it a good candidate for panels which are used in hot and damp environments. Its electrical properties make it beneficial in reflector, antenna, and signal control uses.

In a composite, the resin is configured to support and bond the fibers, transferring applied loads and protecting the fibers from damage. In an aspect, each panel can have a resin content and a resin flow property. The resin content is a measure of an amount of resin in the prepreg expressed as a percentage of the total mass of the prepreg. Examples of resin content include about 47% in the case of a unidirectional fiberglass prepreg and 62% in the case of a unidirectional carbon fiber prepreg (see Tables 1 & 2), although other percentages can also be used as required. In various embodiments, the resin content is 40-70%, preferably 45-50% or 60-65%. In other embodiments the resin content is 40-55% or 55-70%.

The resin flow is a measure of an amount of flow in the prepreg when subjected to a specified temperature and pressure. Examples of the resin flow at 275° F., 25 psi, and 20 min include a minimum of 18% in the case of a unidirectional fiberglass prepreg and 15% in the case of a unidirectional carbon fiber prepreg, although other percentages can also be used as required (see Tables 1 & 2). In other embodiments, resin flow rate is 5-30%, 10-25%, or more preferably 15-20%.

As shown in FIG. 3A, different amounts (thickness) of resin can be selectively established on the outer surface and the inner surface of each prepreg 26a with respect to the reinforcement layer 310 and the panel 20a. This resin differential can result in significant weight savings when applied across the panel and throughout the aircraft structure.

Reinforcement Layer

The reinforcement layer 310 can include thin metallic, glass, or carbon reinforced fabric made of materials including a number of various high-strength, low-weight options and typically having a selected fiber direction, weight, and overall resin content. The reinforcement layer 310, for example, may include a fiberglass or Kevlar® to be electrostatic charge resistant. Fiberglass is lightweight with moderate tensile strength. Kevlar® is strong and has good abrasion resistance. It is often used in panels where impact resistance is important. Carbon fiber is more expensive than fiberglass or Kevlar®, but it has the highest tensile strength. Carbon fiber, additionally, has the highest compressive, bend, and flexural strength of commonly used reinforcement layer materials. Carbon fiber will often be used in load bearing panels.

In an aspect, the reinforcement layer 310 is configured to resist transfer of resin through the fabric. The reinforcement layer 310 can have a fiber areal weight that is measured in grams per square meter (gsm). Examples of the fiber areal weight can be on the order of 120-250 gsm. In an example the fiber areal weight can be one of 244±5 and 120±3 gsm. In other embodiments, the areal weight is 100-300 gsm, 150-250 gsm, 175-225 gsm, 225-260 gsm, or 110-130 gsm. The reinforcement layer 310, for example, may include a thin metallic reinforced fabric for applications when a high strength-to-weight ratio is required including monuments, shelving, partitions, and bulkheads.

In an aspect, a prepreg can have a set of resin layers classified by interfacing layers. As shown in FIG. 4A, the inner resin layer 324 is configured to have a first surface interfacing with the reinforcement layer 310 and a second surface interfacing with the core 22. In an example, the inner resin layer 324 can have a thickness yielding a weight of 0.030 lbs/sqft on the inner or interior surface of the reinforcement layer 310. In other embodiments, the inner surface has a weight of 0.020-0.40, 0.025-0.035, or 0.027-0.033 lbs/sqft.

In an example, the outer resin layer 322 can have a first surface interfacing with the reinforcement layer 310 and a second surface configured to be an exterior surface of the prepreg 26a (see FIG. 4A). In an example, the outer resin layer 322 can have a first surface interfacing with a first reinforcement layer 30a and a second surface interfacing with a second reinforcement layer 312b layer (see FIG. 4B). In an example, the outer resin layer 322 can have a thickness yielding a weight of 0.010 lbs/sqft on the outer or exterior surface of the reinforcement layer 310.

In an example, a prepreg can have a differential resin thickness, such as a first resin layer having 0.008-0.010 lbs/sqft and a second resin layer 0.034-0.037 lbs/sqft. By supplying a differential resin thickness, each panel can be cured without a separate adhesive sheet and the weight of the adhesive film 4 has thereby been eliminated.

In the preceding example, for example, the 0.050 lbs/sqft of resin in the earlier A502 panel example has been reduced by twenty percent to 0.040 lbs/sqft. Moreover, elimination of the need to apply an adhesive film greatly reduces the cost and time for manufacturing the composite panel. By allowing for differing amounts of resin on opposite sides of the reinforcement layer 310, the panel can reduce weight and cost by eliminating the adhesive film. An additional benefit is that there is only a single material (the prepreg 26) that requires cutting and laying up on the core, thereby saving expense and time in the shaping process.

Unidirectional Reinforcement Layer

In an aspect, the reinforcement layer is made from fibers aligned in one direction (i.e. unidirectional). The unidirectional reinforcement layer 312a-b can include thin metallic, glass, or carbon reinforced fabric made of materials including, in some examples, unidirectional carbon and unidirectional fiberglass. In other embodiments, non-unidirectional fabrics may be used as long as the weave type and material construction discourages seepage of the resin from one side to the other during the curing process. Examples of other weave types include a plain weave, a twill weave, and a satin weave. Alternative materials may include aramid.

Figure 4B:
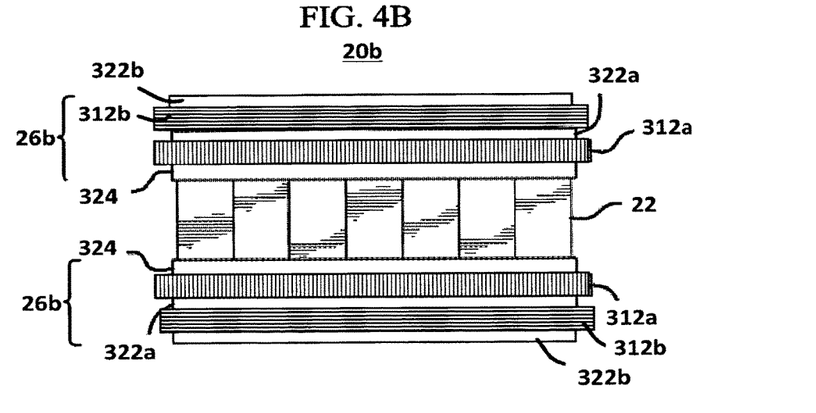
FIG. 4B illustrates a cross-sectional view of a composite panel including the core that is sandwiched between a pair of prepregs, where both prepregs are the prepreg shown in FIG. 3B according to an example.
Figure 4C:
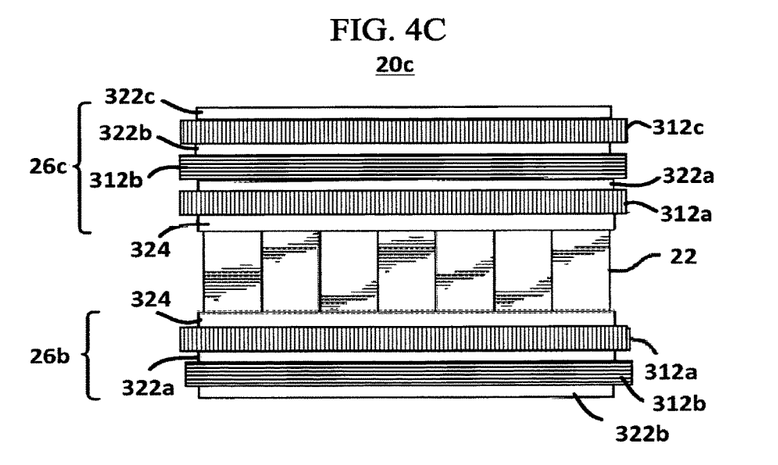
FIG. 4C illustrates a cross-sectional view of a composite panel including the core that is sandwiched between a pair of prepregs, where a first prepreg is the prepreg shown in FIG. 3B and a second prepreg is the prepreg shown in FIG. 3C according to an example.
Figure 4D:
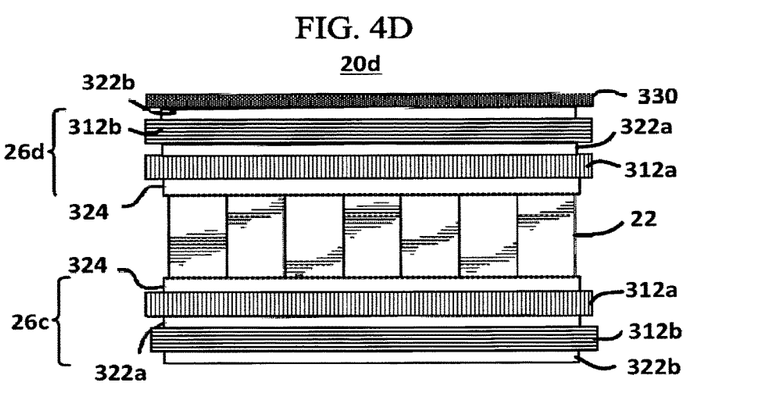
FIG. 4D illustrates a cross-sectional view of a composite panel including the core that is sandwiched between a pair of prepregs, where a first prepreg is the prepreg shown in FIG. 3C and a second prepreg is the prepreg shown in FIG. 3D according to an example.

A composite panel with differential resin layers, in some embodiments, includes two or more reinforcement layers having unidirectional fibers. As shown in FIG. 4B, for example, a panel 20b can be made with a prepreg 26b including a first unidirectional reinforcement layer 312a having fibers aligned in a first direction and a second unidirectional reinforcement layer 312b having fibers aligned in a second direction different than the first direction (e.g. perpendicular).

As illustrated in FIG. 4B, the first unidirectional reinforcement layer 312a is configured to attach to the core 22 with the inner resin layer 324 and to the second unidirectional reinforcement layer 312b with the outer resin layer 322.

Figure 3C:
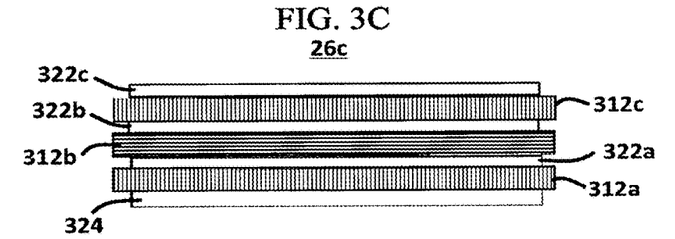
FIG. 3C illustrates a cross-sectional view of the prepreg shown in FIG. 3B further including one or more additional reinforcement layers according to an example.

Additional reinforcement layers can be added and configured to attach to the illustrated underlying reinforcement layers (i.e. 312a and 312b) with the outer resin layers 322. Since the thickness of the outer resin layer 322 is less than that of the inner resin layer 324, a prepreg can be made with additional reinforcement layers, increasing the strength of the prepreg, while limiting additional weight due to the resin. For example, FIG. 3C illustrates a cross-sectional view of a prepreg 26c including additional reinforcement layers according to an example. In another example (not illustrated), the prepreg can include a ply sequence having unidirectional fibers aligned in a 0° direction with a light resin side facing outward, a 0° direction, a 90° direction, and a 90° direction with a heavy resin side interfacing the core.

Foil Layer

Figure 3D:
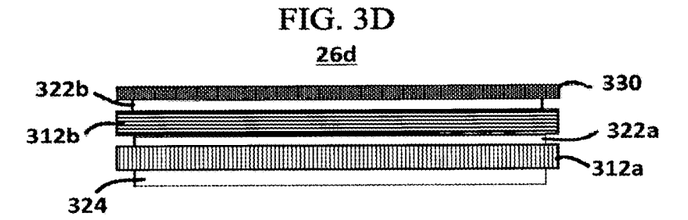
FIG. 3D illustrates a cross-sectional view of the prepreg shown in FIG. 3B further including a foil layer according to an example.

FIG. 3D illustrates a cross-sectional view of the prepreg shown in FIG. 3B further including a foil layer 330 according to an example. A foil layer may be added to the composite panel, in some examples, for water and solvent resistance, electrical conductivity, reflectivity, and/or corrosion resistance. A foil layer may be added to panels for use in flooring, bulkheads, access panels, door panels, and/or wing and tail trailing edges. In an example, the foil layer 300 can be a copper foil having a thickness of around 10 microns. In an example, the foil 330 can be an aluminum alloy such as 2024-T3, 7075-T6 with sheet treatment options such as Clad, Anodized/Chem. film, Primer, Alodine, Bare, etc. In an example, each part of the panel can be configured to meet applicable industry specifications. For example, an aluminum skin that meets the applicable AMSQQ-A-250 specifications, and an aluminum core that meets the AMS-C-7438 specifications.

Performance Metrics

A set of properties for two examples of a prepreg having differential resin content are shown in Tables 1 & 2. Table 1 is an example of a set of physical properties for a unidirectional fiberglass prepreg with differential resin content for certain uses, such as uses for aircraft cabin flooring. Table 2 is an example of a set of physical properties for a unidirectional carbon fiber prepreg with differential resin content. In certain embodiments, the panels may exhibit a peel strength of 6-10 lb/in (of the prepreg to the core). The physical property tests can be done according to industry standard testing methods as indicated in the tables, where ASTM D3531 is a standard test method for resin flow of carbon fiber-epoxy prepreg, ASTM D3532 is a standard test method for gel time of carbon fiber-epoxy prepreg, and NTM-824-37 is a Newport test method.

TABLE 1

| Physical Properties for Unidirectional Fiberglass Prepreg | | | Testing Method Industry Standard |
|---|---|---|---|
| Property | Unit | Requirement | |
| Resin Content | % | 45-49 | NTM-824-37 |
| Fiber Areal Weight | gsm | 244 ± 5 | NTM-824-37 |
| Resin Differential with the higher resin content side on release film side | psf | Side 1: 0.008-0.010 Side 2: 0.034-0.037 | |
| Prepreg Areal Weight | psf | .090-.098 (439-478 gsm) | NTM-824-37 |
| Prepreg Flow (275° F., 25 psi, 20 min) | % | 18 minimum | ASTM D3531 |
| Prepreg Gel Time (min at 275° F.) | min | 3-5 | ASTM D3532 |
| Strength | Ksi | 515 minimum | |
| Modulus | Msi | 10.7 minimum | |

TABLE 2

| Physical Properties for Unidirectional Carbon Fiber Prepreg | | | Testing Method Industry Standard |
|---|---|---|---|
| Property | Unit | Requirement | |
| Resin Content | % | 62 ± 2 | NTM-824-37 |
| Fiber Areal Weight | gsm | 120 ± 3 | NTM-824-37 |
| Resin Differential with the higher resin content side on release film side | psf | Side 1: 0.006-0.008 Side 2: 0.033-0.036 | |
| Prepreg Areal Weight | psf | 0.064-0.070 | NTM-824-37 |
| Prepreg Flow (275° F., 25 psi, 20 min) | % | 15 minimum | ASTM D3531 |

TABLE 2-continued

| Physical Properties for Unidirectional Carbon Fiber Prepreg | | | Testing Method Industry Standard |
|---|---|---|---|
| Property | Unit | Requirement | |
| Prepreg Gel Time (min at 275° F.) | min | 3-6 | ASTM D3532 |
| Strength | Ksi | 667 minimum | |
| Modulus | Msi | 33.7-35.8 | |

The composite panel of the present disclosure can be used to replace or substitute for any panel that uses a unidirectional reinforcement and a film adhesive. Examples of such panels include aircraft interiors, floor paneling, monuments (e.g. seat ottomans, closets, bar units, and lowered ceilings), partitions, bulkheads, overhead bins, ceilings, but other examples are also replete in the transportation industry including for use in locomotives, naval vessels, automobiles, trucking, and space travel. The composite panel provided yields a significant savings in cost and weight, while maintaining optimal performance. Further, the composite panel obviates a need to design a panel based on use of a film adhesive to achieve adequate bond strengths. The composite panel provided includes a modified toughened epoxy resin system and unidirectional fiberglass or carbon skins yielding superior durability performance when compared to the standard OEM floor panel requirements.

Figure 6:
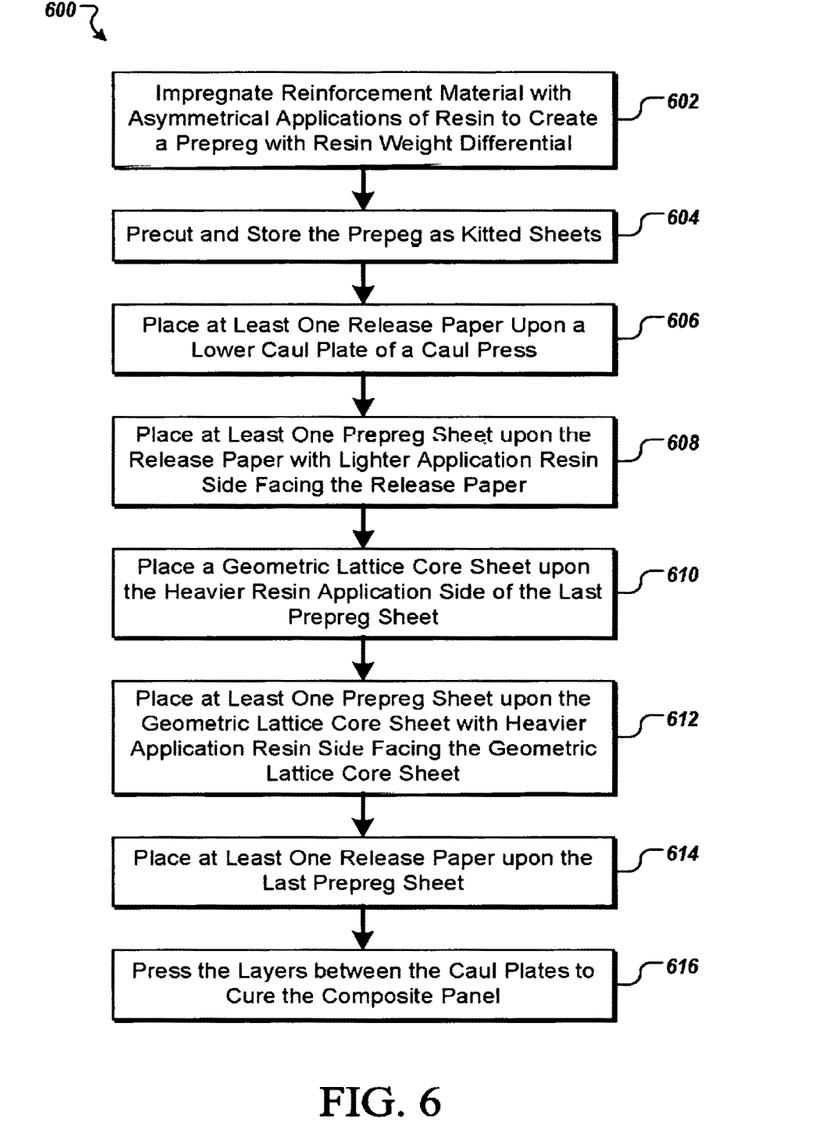
FIG. 6 is a flow chart illustrating a method for preparing a composite panel with differential resin layers according to an example.

Turning to FIG. 6, a flow chart illustrates a method 600 for preparing a composite panel with differential resin layers. The method 600, for example, may be used to manufacture a composite panel as illustrated in any of FIGS. 2, 4A, 4B, 4C, and 4D. The method 600 includes procedures for creating a prepreg such as the prepregs illustrated and described by FIGS. 3A through 3D.

In some implementations, the method 600 begins with impregnating reinforcement material with asymmetrical applications of resin to create a resin weight differential between a first side of the reinforcement material and a second side of the impregnated reinforcement material (prepreg) (602). The reinforcement material, in some embodiments, is a unidirectional fiber material such as a fiberglass or carbon fiber material. The density and structure of the reinforcement material, in some embodiments, may be selected to avoid seepage of the resin through the material. For example, the ply thickness, weight, and/or fiber finish of the reinforcement material may be selected to avoid seepage of the resin. The resin, for example, may be an epoxy.

The resin may be applied in a heavier (e.g., thicker) application on a first side of the reinforcement material and in a lighter (e.g., thinner) application on a second side of the reinforcement material. There are two main types of manufacturing methods for producing a prepreg; a hot melt method and a solvent dip method. The hot melt method is conducted in two stages. In a first stage, the resin is heated and coated onto a paper substrate in a thin film or resin film. In a second stage, the fabric reinforcement and the resin film are brought together. A roller may be used to apply a pressure to implant the fibers in the resin film, combining heat and pressure. In the solvent dip method, the resin is dissolved in a bath of solvent forming a resin solution. Next, the reinforcing fabric is dipped into the resin solution. Using an oven, the solvent is then evaporated from the prepreg.

In some embodiments, the impregnated reinforcement material (prepreg) produced with asymmetrical resin application includes a release paper layer. The release paper layer, for example, may be applied to the side of the impregnated reinforcement material having the heavier application of resin.

The prepreg, in some embodiments, is produced using two or more layers of reinforcement material. Each layer of reinforcement material may be bonded to the next layer of reinforcement material through impregnation with a layer of resin. The sandwich layer of resin (e.g., between two adjacent layers of reinforcement material) may be applied, in some embodiments, in a weight similar to the lighter application side of the prepreg. If the reinforcement material is a unidirectional fiber material, a second layer of reinforcement material may be adhered to a first layer of reinforcement material such that the fibers are perpendicular in direction between the first layer and the second layer.

In some implementations, the impregnated reinforcement material is precut and stored ("kitted") (604). For example, the prepreg material may be produced in a first location and transported to a second location for preparation of the composite panel.

In some implementations, at least one release paper is placed upon a lower caul plate of a caul press (606). A first release paper, for example, may be positioned with its release side facing the caul plate. The release paper (film or other material) is designed to help separate the composite panel from the caul press after curing. A second release paper may be positioned with its release side facing away from the caul plate.

In some embodiments, a caul sheet is placed between the caul plate and the first release paper. A caul sheet is typically a smooth, flat metal sheet that is used as a surface for laying up panels. In preparation, resin buildup on the caul sheet from previous cures should be removed from the caul sheet. The caul sheet can be cleaned using a solvent and a cloth. It is important for the caul sheet to be clean and to be free from scratches, waviness, and dents. Imperfections in the caul sheet are likely to result in imperfections in the cured panel.

In some implementations, at least one prepreg sheet is placed upon the release paper with the lighter resin application side facing the release paper (608). If two release papers are used, the first prepreg sheet is placed upon the release side of the second release paper.

In some embodiments, subsequent prepreg sheets or other material layers are laid either prior to the first prepreg sheet or upon the first prepreg sheet. For example, a copper foil layer may be applied between the second release paper and the first prepreg sheet. Where multiple prepreg sheets are used, the prepreg sheets may be designed such that a resin differential will exist between the caul plate-facing side of the first prepreg sheet and the caul plate-opposing side of the last prepreg sheet.

In some implementations, a geometric lattice core sheet is placed upon the last prepreg sheet (610). The geometric lattice core sheet, for example, is laid upon the heavier resin application side of the last prepreg sheet. The geometric lattice core sheet, in a particular example, is a hexagonal honeycomb core.

In some implementations, at least one-prepreg sheet is placed upon the geometric lattice core sheet with its heavier resin application side facing the geometric lattice core sheet (612). The prepreg sheet may be of the same or different material and/or construction than the prepreg sheet used to interface with the other side of the geometric lattice core. In some embodiments, subsequent prepreg sheets or other material layers are laid upon the first prepreg sheet. Where multiple prepreg sheets are used, the prepreg sheets may be designed such that a resin differential will exist between the core-facing side of the first prepreg sheet and the core-opposing side of the last prepreg sheet.

In some implementations, at least one release paper is positioned upon the last prepreg sheet (614). A first release paper, for example, may be positioned with its release side facing the last prepreg sheet. A second release paper may be positioned with its release side facing away from the last prepreg sheet (e.g., towards an upper caul plate). In some embodiments, a caul sheet is placed between the upper caul plate and the second release paper.

In some implementations, the layers of materials including the prepreg sheets and the lattice core are pressed between the caul plates to cure (616). Pressure and temperature applied over time by the caul press adheres and cures the various layers into a composite panel.

Industry Skepticism

From the foregoing it can be appreciated that the panel constructions of the invention can provide substantial weight savings while maintaining or improving panel strength and other performance metrics. Although others in the industry believed that resin migration through the prepreg would substantially or entirely nullify the benefits of the techniques described herein, the inventor has found that the techniques generate at least about a 10% weight savings with no sacrifice of panel properties. This result was surprising, particularly to those in the industry who expressed skepticism as to the feasibility of the approach.

The foregoing detailed description of the innovations included herein is not intended to be limited to any specific figure or described embodiment. One of ordinary skill would readily envision numerous modifications and variations of the foregoing examples, and the scope of the present disclosure is intended to encompass all such modifications and variations. Accordingly, the scope of the claims presented is properly measured by the words of the appended claims using their ordinary meanings, consistent with the descriptions and depictions herein.

The invention claimed is:

1. A composite panel, comprising:
a core layer having a lattice based on a repeating geometric shape;
a first reinforcement layer adhered to a first surface of the core layer using a resin formulation;
a second reinforcement layer adhered to an opposing surface of the core layer using the resin formulation;
wherein the first reinforcement layer and the second reinforcement layer are adhered to the core layer by constructing a panel layup assembly upon a mold, the panel layup assembly including
a first prepreg layer comprising the resin formulation and the first reinforcement layer, wherein the first prepreg layer comprises a first layer of the resin formulation upon a first outer surface of the first prepreg layer, and a second layer of the resin formulation upon an opposing outer surface of the first prepreg layer, wherein
the first layer of the resin formulation is thinner than the second layer of the resin formulation, and
the first layer of the resin formulation is presented toward the mold,
the core layer, wherein the second layer of the resin formulation directly abuts a first outer surface of the core layer, and
a second prepreg layer comprising the resin formulation and the second reinforcement layer, wherein
the second prepreg layer comprises a first layer of the resin formulation upon a first outer surface of the second prepreg layer, and a second layer of the resin formulation upon an opposing outer surface of the second prepreg layer, wherein
the first layer of the resin formulation is thinner than the second layer of the resin formulation, and
the second layer of the resin formulation directly abuts a second outer surface of the core layer, and
curing the composite panel within the mold.

2. The composite panel of claim 1, wherein the core layer is a honeycomb structure having repeating hexagonal shapes.

3. The composite panel of claim 1, wherein the resin formulation includes a heat resistant phenolic resin.

4. The composite panel of claim 1, wherein a weight ratio of the first layer of the resin formulation of the first prepreg layer to the second layer of the resin formulation of the first prepreg layer is at least 2:1.

5. The composite panel of claim 4, wherein a weight ratio of the first layer of the resin formulation of the first prepreg layer to the second layer of the resin formulation of the first prepreg layer is at least 3:1.

6. The composite panel of claim 1, wherein the first reinforcement layer is a unidirectional fabric.

7. The composite panel of claim 1, wherein the core layer includes aramid.

8. The composite panel of claim 7, wherein the core layer has a compressive strength ranging from 86 to 1700 pounds per square inch (psi).

9. The composite panel of claim 1, wherein the core layer includes aluminum.

10. The composite panel of claim 9, wherein the core layer has a compressive strength ranging from 75-620 psi.

11. The composite panel of claim 1, wherein the core layer includes at least one of aramid fiber paper, aluminum, Kevlar, Nomex, steel, polystyrene, or polypropylene.

12. The composite of claim 1, wherein the resin formulation includes at least one of a polymer resin, a phenolic resin, a bismaleimide resin, a cyanate ester resin, a polyester resin, or a vinyl ester resin.

13. The composite of claim 1, wherein the resin formulation corresponds to a resin content greater than 40 percent and less than 70 percent of a total mass of the first prepreg layer and the second prepreg layer.

14. The composite of claim 1, wherein the first reinforcement layer includes a fiberglass or Kevlar.

* * * * *